United States Patent
Chamberlin et al.

(10) Patent No.: US 8,497,607 B2
(45) Date of Patent: Jul. 30, 2013

(54) ELECTRIC MACHINE WITH INTEGRATED COOLANT TEMPERATURE SENSOR

(75) Inventors: Bradley D. Chamberlin, Pendleton, IN (US); David A. Fulton, Anderson, IN (US)

(73) Assignee: Remy Technologies, L.L.C., Pendleton, IN (US)

( * ) Notice: Subject to any disclaimer, the term of this patent is extended or adjusted under 35 U.S.C. 154(b) by 257 days.

(21) Appl. No.: 13/007,181

(22) Filed: Jan. 14, 2011

(65) Prior Publication Data
US 2012/0181883 A1 Jul. 19, 2012

(51) Int. Cl.
*H02K 9/00* (2006.01)
(52) U.S. Cl.
USPC .................................. 310/53; 310/52; 310/59
(58) Field of Classification Search
USPC ........................................... 310/52–59, 68 C
See application file for complete search history.

(56) References Cited

U.S. PATENT DOCUMENTS

| | | | |
|---|---|---|---|
| 7,339,295 B2* | 3/2008 | Knauff | 310/68 C |
| 7,462,963 B2* | 12/2008 | Ishihara et al. | 310/58 |
| 7,759,831 B2* | 7/2010 | Yagi | 310/68 R |
| 2002/0140298 A1* | 10/2002 | Maruyama | 310/54 |
| 2005/0285458 A1* | 12/2005 | Moeleker et al. | 310/57 |
| 2006/0017336 A1* | 1/2006 | Knauff | 310/68 C |
| 2006/0113851 A1* | 6/2006 | Ishihara et al. | 310/52 |

* cited by examiner

*Primary Examiner* — Thanh Lam
(74) *Attorney, Agent, or Firm* — Cantor Colburn LLP

(57) ABSTRACT

An electric machine including a housing, a stator mounted within the housing, a rotor rotatably mounted within the housing relative to the stator, and a coolant system fluidly connected to the housing. The coolant system delivers a flow of coolant through the housing. A coolant temperature sensor is arranged within the housing and exposed to the flow of coolant. The coolant temperature sensor configured and disposed to detect a temperature of the coolant in the housing.

11 Claims, 2 Drawing Sheets

Figure 1:
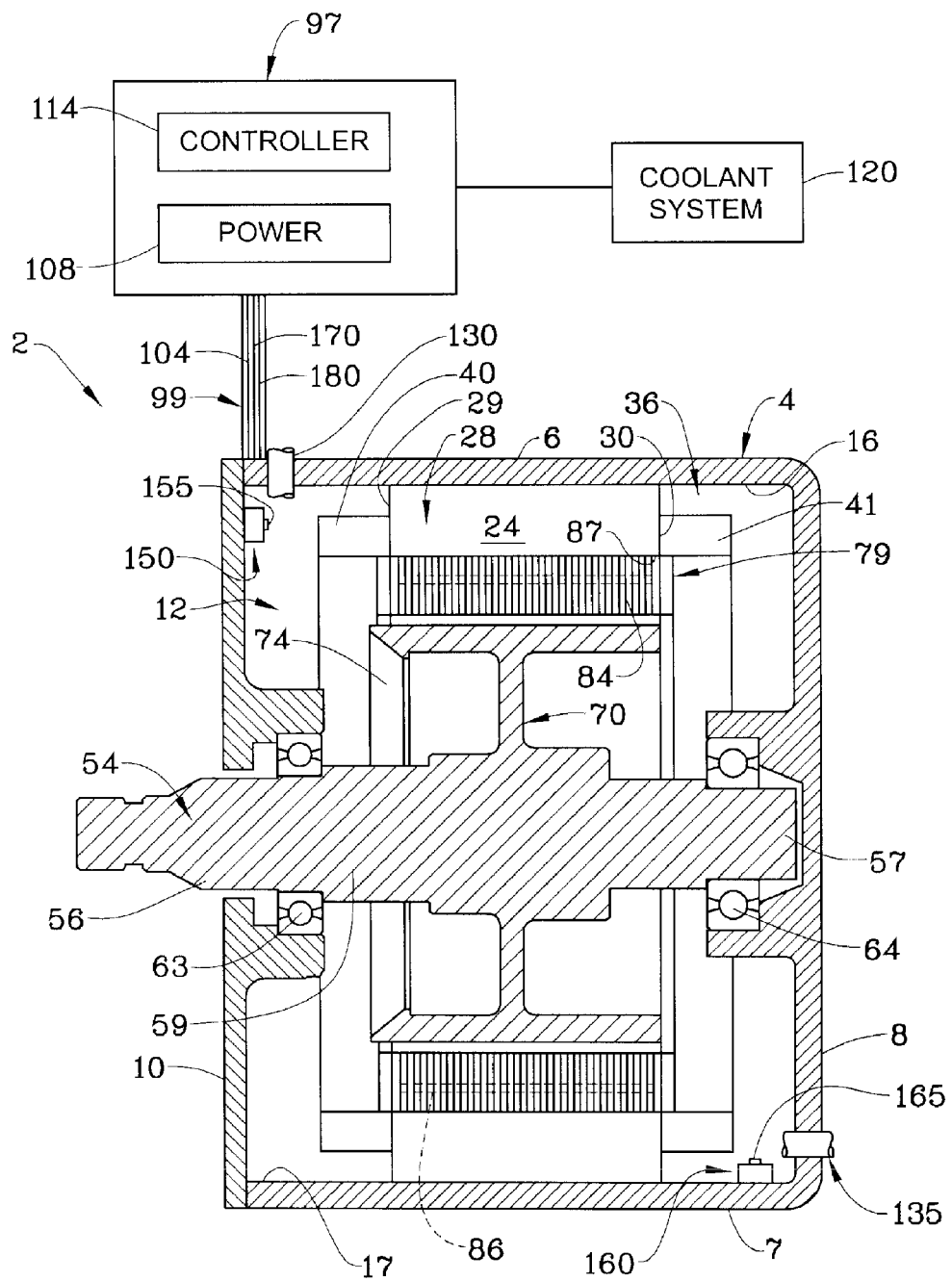
Figure 2:
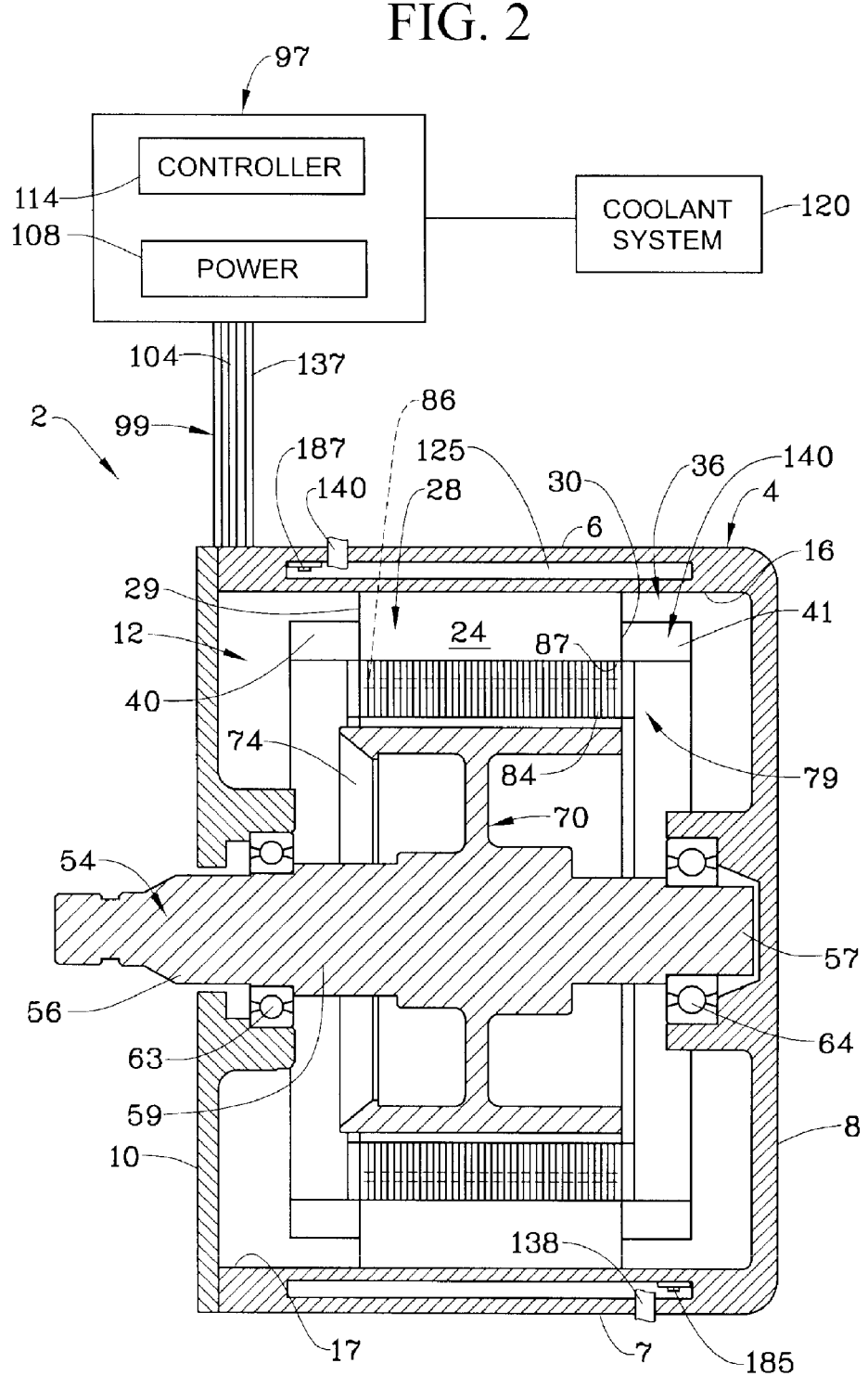

ELECTRIC MACHINE WITH INTEGRATED COOLANT TEMPERATURE SENSOR

BACKGROUND OF THE INVENTION

Exemplary embodiments pertain to the art of electric machines and, more particularly, to an electric machine having an integrated coolant temperature sensor.

Electric machines produce work from electrical energy passing through a stator to induce an electro-motive force in a rotor. The electro-motive force creates a rotational force at the rotor. The rotation of the rotor is used to power various external devices. Of course, electric machines can also be employed to produce electricity from a work input. In either case, electric machines are currently producing greater outputs at higher speeds and are being designed in smaller packages. The higher power densities and speeds often result in harsh operating conditions such as high internal temperatures, vibration and the like. Accordingly, many conventional electric machines include sensors that monitor, for example stator temperature, and the like. The sensors typically take the form of temperature sensors that are mounted to end turn portions of the stator. The sensors include a separate wiring harness that is coupled to, for example, a controller that reads and/or records sensed data.

BRIEF DESCRIPTION OF THE INVENTION

Disclosed is an electric machine including a housing, a stator mounted within the housing, a rotor rotatably mounted within the housing relative to the stator, and a coolant system fluidly connected to the housing. The coolant system delivers a flow of coolant through the housing. A coolant temperature sensor is arranged within the housing and exposed to the flow of coolant. The coolant temperature sensor configured and disposed to detect a temperature of the coolant in the housing.

Also disclosed is a method of operating an electric machine. The method includes rotating a rotor relative to a stator within a housing, passing a flow of coolant through the housing, measuring a temperature of the coolant, and adjusting the flow of the coolant based on the measured temperature of the coolant.

BRIEF DESCRIPTION OF THE DRAWINGS

The following descriptions should not be considered limiting in any way. With reference to the accompanying drawings, like elements are numbered alike:

FIG. 1 is a cross-sectional side view of an electric machine including an integrated coolant temperature sensor in accordance with an exemplary embodiment; and FIG. 2 is a cross-sectional side view of an electric machine including an integrated coolant temperature sensor in accordance with another exemplary embodiment.

DETAILED DESCRIPTION OF THE INVENTION

A detailed description of one or more embodiments of the disclosed apparatus and method are presented herein by way of exemplification and not limitation with reference to the Figures.

Exemplary embodiments provide a temperature sensor that is integrated directly into an electric machine. The temperature sensor is positioned within the electric machine and monitors coolant temperature. Monitoring coolant temperature enhances machine reliability by providing an indicator as to a need for more or less cooling. Monitoring coolant temperature also provides an indication of coolant condition. Coolant can degrade or lose lubricating properties if exposed to temperatures above a certain level. Thus, coolant flow can be adjusted based on coolant temperatures. Higher coolant temperatures may indicate a need for greater coolant flow and lower coolant temperatures may indicate a need for less coolant flow. Reducing coolant flow to the electric machine results in a corresponding reduction in work required by corresponding pumps, fans etc that are used to create the coolant flow. Reducing operating load on auxiliary devices enhances an overall operating efficiency to the electric machine. Also, integrating the temperature sensor into the electric machine eliminates any need for additional wiring harnesses or additional external connections that increase cost, complexity, and an overall number of potential failure points.

An electric machine in accordance with an exemplary embodiment is indicated generally at 2 in FIG. 1. Electric machine 2 includes a housing 4 having first and second side walls 6 and 7 that are joined by a first end wall 8 and a second end wall or cover 10 to collectively define an interior portion 12. First side wall 6 includes an inner surface 16 and second side wall 7 includes an inner surface 17. At this point it should be understood that housing 4 could also be constructed to include a single side wall having a continuous inner surface. Electric machine 2 is further shown to include a stator 24 arranged at inner surfaces 16 and 17 of first and second side walls 6 and 7. Stator 24 includes a body 28, having a first end portion 29 that extends to a second end portion 30, which supports a plurality of windings 36. Windings 36 include a first end turn portion 40 and a second end turn portion 41.

Electric machine 2 is also shown to include a shaft 54 rotatably supported within housing 4. Shaft 54 includes a first end 56 that extends to a second end 57 through an intermediate portion 59. First end 56 is rotatably supported relative to second end wall 10 through a first bearing 63 and second end 57 is rotatably supported relative to first end wall 8 through a second bearing 64. Shaft 54 supports a rotor 70 that is rotatably mounted within housing 4. Rotor 70 includes a hub 74 that is fixed relative to intermediate portion 59, and a rotor lamination assembly 79. Rotor lamination assembly 79 includes a plurality of laminations, one of which is indicated at 84. Laminations 84 are stacked and aligned through use of, for example, one or more alignment pins such as shown at 86, to define an outer diametric surface 87 of rotor lamination assembly 79.

Electric machine 2 is electrically connected to a motor control panel 97 through a wire harness 99. Wire harness 99 includes a plurality of power conductors, one of which is indicated at 104, which electrically couple stator 24 with a power source 108 having terminals (not shown) arranged in motor control panel 97. Motor control panel 97 also houses a controller 114 that may be employed to control motor starting, motor speed, and/or motor shut down, as well as various other operating parameters. In the exemplary embodiment shown, controller 114 is linked to a coolant system 120 that delivers a flow of coolant, such as oil, airflow or the like, through housing 4. By "through" it should be understood that coolant system 120 may be configured to pass a flow of coolant, such as air or oil, directly onto rotor 70, first and second bearings 63 and 64 and/or first and second end turn portions 40 and 41 of stator 24, or indirectly through housing 4 such as by flowing a coolant, such as through a water jacket 125 as shown in FIG. 2 wherein like reference numbers represent corresponding parts in the respective views. In the exemplary embodiment shown, coolant system 120 includes a coolant inlet 130 that passes through side wall 6 and a coolant outlet 135 that passes through first end wall 8 at side wall 7. Of course it should be understood that the particular form and locations of coolant inlet 130 and coolant outlet 135 could vary. For example, in the embodiment illustrated in FIG. 2, water jacket 125 is provided with a coolant inlet 138 in the form of a boss formed on side wall 7, and a coolant outlet 140 in the form of a boss formed on side wall 6.

In accordance with an exemplary embodiment, electric machine 2 includes a first coolant temperature sensor 150 arrange adjacent to coolant inlet 130. First coolant temperature sensor 150 includes a sensing surface 155 that is exposed to the flow of coolant passing through coolant inlet 130. Electric machine 2 is also shown to include a second coolant temperature sensor 160 arrange at coolant outlet 135. Second coolant temperature sensor 160 includes a sensing surface 165 that is exposed to the flow of coolant passing through coolant outlet 135 from housing 4. First and second coolant temperature sensors 150 and 160 are electrically coupled to controller 114 via first and second sensing lines 170 and 180 that pass through wire harness 99 along side power conductors 104. First and second coolant temperature sensors 150 and 160 take the form of a thermistor. However, it should be understood that other temperature contact sensing devices such as resistance temperature devices (RTD) and thermocouples, and non-contact sensing devices such as infra-red sensors, can also be employed. As an alternative to first and second coolant sensors 150 and 160, electric machine 2 could include coolant sensors 185 and 187 arranged in water jacket 125 at inlet 138 and outlet 140 respectively.

With this arrangement, controller 114 monitors the flow of coolant entering and exiting housing 4. More specifically, controller 114 determines a temperature differential between the temperature of the flow of coolant entering housing 4 and the temperature of the flow of coolant exiting housing 4. Based on the temperature differential, controller 114 determines an amount of heat being rejected into the flow of coolant from electric machine 2. Controller 114 will either adjust the flow of coolant, or the operating parameters of the electric machine based upon the temperature differential. For example, if the amount of heat rejected into the coolant is above a predetermine level, controller 114 may reduce an operating power of electric machine 2 and/or increase the flow of coolant to improve operating efficiency and/or output from electric machine 2. Conversely, if the amount of heat being rejected into the flow of coolant is below a predetermined level, controller 114 may increase operating power or reduce the flow of coolant to enhance operating efficiency. Controller 114 may also adjust motor performance based on an exit temperature of the coolant in order to minimize exposure to elevated temperatures.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
a housing;
a stator mounted within the housing;
a rotor rotatably mounted within the housing relative to the stator;
a coolant system fluidly connected to the housing, the coolant system delivering a flow of coolant through the housing; and
a coolant temperature sensor arranged within the housing and exposed to the flow of coolant, the coolant temperature sensor configured and disposed to detect a temperature of the coolant in the housing to control coolant flow through the housing.

2. The electric machine according to claim 1, wherein the coolant system includes a coolant inlet that passes the flow of coolant into the housing and a coolant outlet that delivers the flow of coolant from the housing, the coolant temperature sensor being arranged at one of the coolant inlet and the coolant outlet.

3. The electric machine according to claim 2, further comprising: another coolant temperature sensor arranged within the housing, the another coolant temperature sensor being arranged at the other of the coolant inlet and the coolant outlet.

4. The electric machine according to claim 1, further comprising: a motor control panel including a power source and a controller, the electric machine being electrically connected to the motor control panel through a wire harness including power conductors that electrically link the stator and the power source and sensing lines that electrically link the controller and the coolant temperature sensor.

5. The electric machine according to claim 1, wherein the temperature sensor is a non-contact temperature sensor.

6. The electric machine according to claim 5, wherein the non-contact temperature sensor is an infra-red sensor.

7. The electric machine according to claim 1, wherein the coolant temperature sensor is in direct contact with the flow of coolant.

8. The electric machine according to claim 7, wherein the coolant temperature sensor is one of a thermistor and a resistance temperature device (RTD).

9. The electric machine according to claim 1, wherein the flow of coolant is a liquid.

10. The electric machine according to claim 9, wherein the liquid is one of an oil, a water, and a mixture containing glycol.

11. The electric machine according to claim 1, wherein the flow of coolant comprises air.

* * * * *